May 30, 1933. A. J. WEATHERHEAD, JR 1,911,540
CONTROL ASSEMBLY
Filed Dec. 14, 1931
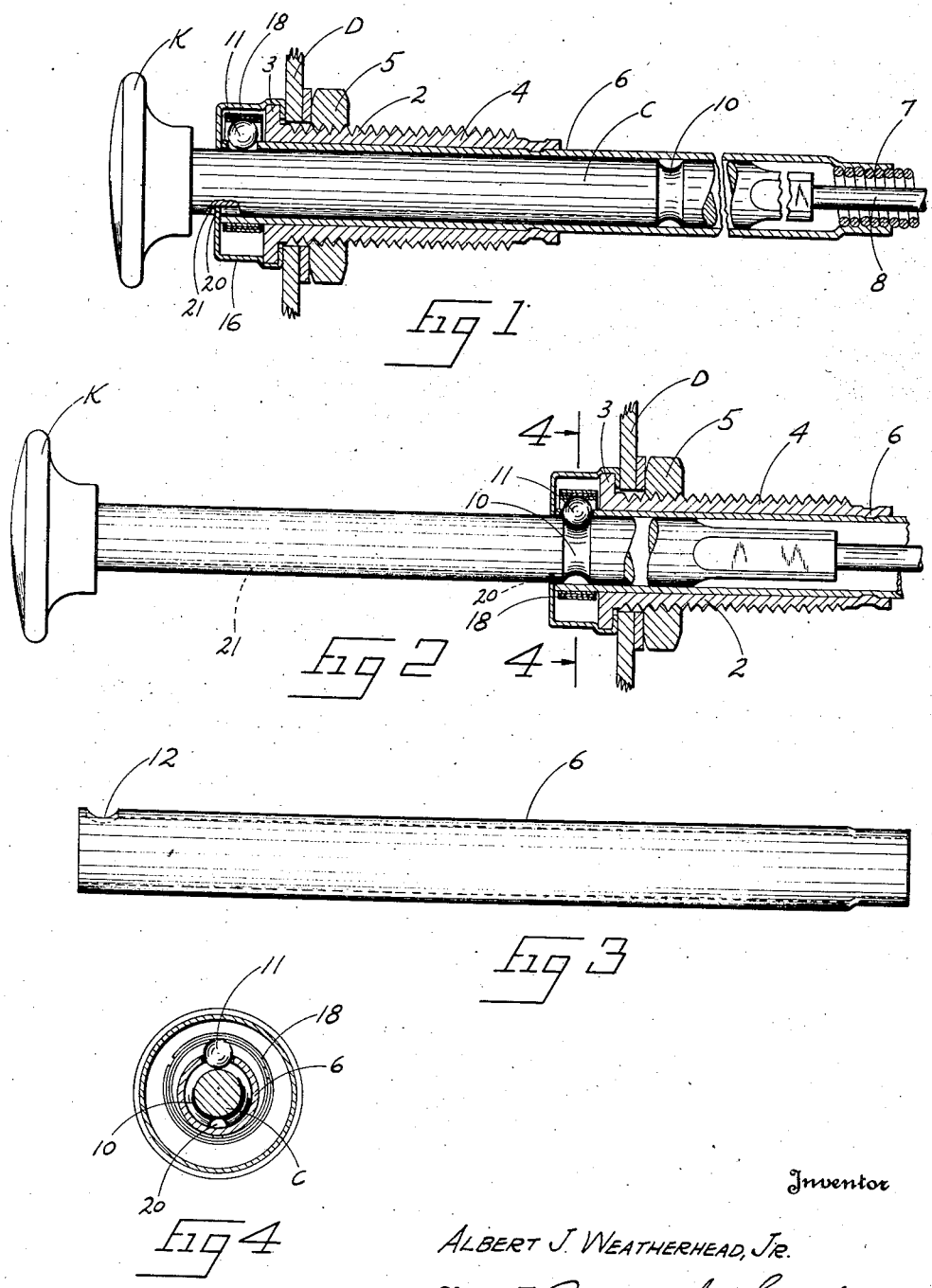
Inventor
ALBERT J. WEATHERHEAD, JR.
By Richey & Watts
Attorney Patented May 30, 1933

1,911,540

UNITED STATES PATENT OFFICE

ALBERT J. WEATHERHEAD, JR., OF CLEVELAND, OHIO

CONTROL ASSEMBLY

Application filed December 14, 1931. Serial No. 580,783.

This invention relates to control devices and particularly to a friction lock for the control rod. It is particularly adapted for instrument panel or dash mounting and may be advantageously employed for operating such instrumentalities as the choke, carburetor, cut-out, free wheeling clutch or other devices common to automotive vehicles. However, it is to be understood that this control device is not limited to use in connection with automotive vehicles and appurtenances common thereto but may be employed in other and further capacities, if so desired.

This application is an improvement over as well as a continuation of my copending application for United States Letters Patent, filed August 13, 1931, Serial No. 556,736 wherein I have shown and described a novel form of control assembly that includes a friction lock on the control rod, comprising a spring pressed ball seated on the control rod and retained in position by a ring affixed to the escutcheon tube, the ball being adapted to cooperate with a circumferentially reduced portion of the control rod, defining farthest outward position thereof. However, in the present invention, I intend to replace the retaining ring for the ball member in a novel manner by aperturing the end of the escutcheon tube and permitting the same to act as a retainer for the ball, which simplifies the assembly and reduces considerably the cost of manufacture albeit without departing from the precepts and teachings of my prior application and without jeopardizing the efficiency of the lock.

It is therefore the principal object of this invention to provide a simplified control assembly by employing the escutcheon tube in the capacity of a ball retainer, thus obviating the necessity for a separate retaining ring. Another object is to facilitate as well as to accelerate the assembly of the parts and to reduce both manufacturing and assembly costs.

Other objects and advantageous features of this invention will be noted in the following detailed description and accompanying drawing wherein like characters of reference indicate like parts and wherein:

Figure 1 is a vertical longitudinal section of the control device.

Figure 2 is a detail in section showing the control rod in projected and locked position.

Figure 3 is a longitudinal section of the escutcheon tube.

Figure 4 is a section taken on the line 4—4 of Fig. 2.

With reference to the drawing, I have shown in Fig. 1 the preferred form of my control assembly as including a control rod C, constituting the part ordinarily manipulated by the operator, that is knobbed as at K for ready grasping. An escutcheon tube 6 encompasses and slidably supports the control rod, the escutcheon tube being in turn, supported by an escutcheon 2 affixed to the dash panel D, gripped between the head 3 thereof and the lock washer and nut assembly 5 screwed on the threaded shank 4.

The inner end of the escutcheon tube 6 is contracted to smaller diameter upon one end of a spirally wound conduit 7 which houses a flexible control member 8 that is affixed, at one end, to the part to be controlled and joined, at the other end, to the control rod. The particular assembly just described, is essentially the same as that shown in my copending application and it is obvious that a pull outwardly on the knob K will result in the projection of the control rod C and the operation of the part under control, through the medium of the flexible control member 8.

To maintain the control rod in adjusted position and to prevent the release thereof as well as the release of the part under control, I have provided a friction lock that consists in, essentially, the same elements, (namely a spring pressed ball adapted to cooperate with a circumferentially reduced portion of the control rod) as that shown and described in my copending application.

In the present application, the spring is shown by the numeral 18 and the ball member indicated by the numeral 11 and is shown in Fig. 1 as resting on the periphery of the control rod, the reduced portion of the rod being indicated by the numeral 10. However, in place of the retaining ring disclosed in my copending application, I have employed the escutcheon tube in the capacity of "ball retainer" by aperturing the end thereof as at 12, Figs. 1 and 3, wherein the ball is received and restrained against longitudinal travel with the control rod. The diameter of the opening is somewhat greater than the diameter of the ball to permit the same to drop freely into seating engagement with the reduced portion 10, without danger of "sticking" in the opening as would naturally occur if the diameter of the ball and aperture were to coincide.

The aperture is placed in the periphery of the escutcheon tube in the zone immediately behind the forward end thereof and in that portion projecting beyond the head 3 enclosed by a cap 16 spun over the head 3 and apertured in its radial wall to permit the control C to extend therethrough. By reason of this portion projecting beyond the head 3, the escutcheon tube is elongated slightly over the tube of my copending application and differs further in that it is of constant diameter throughout its length which does away with the step of enlarging the end thereof, as taught in my application supra and turning back the end of the tube to form a radial part against which the radial flange of the retaining ring abuts.

Further, in the assembly of the parts, particularly that step of the procedure having to do with the centering of the retaining ring and the holding of the same in centered position until the cap is spun thereover, is obviated.

The cap is intended to enclose the parts of the assembly lying without the dash panel and also serves to confine and retain the resilient member 18 intended to urge the ball into frictional engagement with the control rod, the resilient member being made up of a plurality of overlapping convolutions of flexible material. The radial wall of the cap is also provided with a part 20 that projects into the aperture and is adapted to cooperate with a longitudinal groove 21 in the central rod for preventing rotation of the control rod about its longitudinal axis.

As hereinbefore mentioned, the spring is intended to urge the ball into frictional contact with the control rod and when such rod is reciprocated to projected position; then into seating engagement with the circumferentially reduced portion 10 defining farthest outward position, as best shown in Fig. 2. It will be noted that the depth of the circumferentially reduced portion 10 is not sufficient to allow the ball to drop below center therein; hence, the resistance is essentially frictional, supplemented, of course, by the force of the spring. When the control rod is moved inwardly toward the dash, under the hand of the operator, a high degree of frictional resistance is initially encountered to eject the ball from the reduced portion. However, once the ball is raised, it rides along the external periphery of the control rod as the rod is drawn toward the dash panel under the forces in tension in the control wire.

Although I have not shown it in the drawing, the rod may be provided with an additional reduced portion immediately behind the knob K into which the ball may be urged when the control is in the forward position with the knob adjacent the panel, thus offering means for frictionally locking the rod in unprojected position.

It will be appreciated that by aperturing the end of the escutcheon tube and replacing the retaining ring of my copending application in this novel manner, I have succeeded in reducing the actual number of parts necessary in this control assembly. This change in construction is meritorious in that the assembly of the units is facilitated not to mention the lowering of the cost of the unit both as to the manufacture and subsequent sale.

Inasmuch as modifications and alterations will appear to those skilled in the art, I do not care to be limited to the particular structure shown other than by the claims appended hereto.

I claim:—

1. In a control assembly, an escutcheon tube, means for mounting said tube on the dash panel of an automotive vehicle, a control rod slidable in said tube and having a control wire affixed to one end thereof, said control rod having at least one circumferentially reduced portion defining the limit of movement, in one direction, of the control rod, means for cooperating with said circumferentially reduced portion to lock said control rod in one position of adjustment, said means being retained in position by said escutcheon tube and being urged into said reduced portion by a resilient member encircling said escutcheon tube, and a cap engaging said escutcheon tube for retaining said resilient member in position.

2. In a control assembly, the combination of an escutcheon tube having a lateral aperture adjacent one end thereof, a control rod slidably mounted within said escutcheon tube and having a circumferentially reduced portion, a spherical member retained within said aperture and adapted to cooperate with said circumferentially reduced portion to retain said control rod in one position of adjustment, a spring member surrounding said escutcheon tube and in engagement with said spherical member, and a cap surrounding the end of the escutcheon tube for retaining said spring member in position.

3. In a control assembly, the combination of an escutcheon, an escutcheon tube supported within said escutcheon and having a portion projecting beyond the end thereof, said projecting portion having an aperture in the wall thereof, a control rod slidably mounted within said escutcheon tube and having a circumferentially reduced portion, a spherical member retained within said aperture and adapted to project within said escutcheon tube and to cooperate with said circumferentially reduced portion to retain said control rod in one position of adjustment, a spring member surrounding said escutcheon tube and adapted to urge said spherical member into engagement with said rod, and a cap adjacent the end of the escutcheon tube for retaining said spring member in position.

4. In a control assembly, the combination of an escutcheon having a flanged end adapted to engage a panel, an escutcheon tube supported within said escutcheon and having a portion projecting beyond the flanged end thereof, said projecting portion having an aperture in the wall thereof, a control rod slidably mounted within said escutcheon tube and having a circumferentially reduced portion, a spherical member retained within said aperture and adapted to cooperate with said circumferentially reduced portion to retain said control rod in one position of adjustment, a spring member surrounding said escutcheon tube and adapted to urge said spherical member into engagement with said rod, and a cap engaging the end of the escutcheon tube and the flanged portion of the escutcheon for retaining said spring member in position.

5. In a control assembly, the combination of an escutcheon having a flanged end adapted to engage a panel, a coaxially disposed tubular projection extending beyond the flanged end of the escutcheon, said projection having an aperture in the wall thereof, a control rod slidably mounted within said tubular projection and having a circumferentially reduced portion, a spherical member retained within said aperture and adapted to cooperate with said circumferentially reduced portion to retain said control rod in one position of adjustment, a spring member surrounding said projection and adapted to urge said spherical member into engagement with said rod, and a cap engaging the end of said projection for retaining said spring member in position.

6. In a control assembly, the combination of an escutcheon having a flanged end adapted to engage a panel, an escutcheon tube supported within said escutcheon and having a portion projecting beyond the flanged end thereof, said projecting portion having an aperture in the wall thereof, a control rod slidably mounted within said escutcheon tube, a spherical member retained within said aperture and adapted to engage said control rod, a spring member surrounding said escutcheon tube and adapted to urge said spherical member into engagement with said rod, and a cap engaging the end of the escutcheon tube and the flanged portion of the escutcheon for retaining said spring member in position.

7. In a control assembly, the combination of a reciprocable control rod, and means for frictionally supporting said control rod comprising a hollow guide adapted to project through an apertured panel, and having a flanged portion adapted to engage a face of the panel, a tubular projection, said tubular projection having an aperture in the wall thereof, a spherical member disposed within said aperture and adapted to engage said rod, a resilient member surrounding said projection and adapted to urge said spherical member into engagement with said rod, and means adjacent said tubular projection for retaining said resilient member in position.

In testimony whereof I hereunto affix my signature.

ALBERT J. WEATHERHEAD, Jr.